United States Patent
Hattori

(10) Patent No.: US 9,633,786 B2
(45) Date of Patent: Apr. 25, 2017

(54) MULTILAYER CAPACITOR AND USAGE METHOD THEREFOR

(71) Applicant: Murata Manufacturing Co., Ltd., Nagaokakyo-shi, Kyoto-fu (JP)

(72) Inventor: Kazuo Hattori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 111 days.

(21) Appl. No.: 14/700,401

(22) Filed: Apr. 30, 2015

(65) Prior Publication Data
US 2015/0325371 A1 Nov. 12, 2015

(30) Foreign Application Priority Data

May 9, 2014 (JP) ................. 2014-097516

(51) Int. Cl.
| | |
|---|---|
| H01G 4/30 | (2006.01) |
| H01G 4/012 | (2006.01) |
| H01G 4/248 | (2006.01) |
| H01G 4/12 | (2006.01) |
| H01G 4/232 | (2006.01) |
| H01G 4/38 | (2006.01) |

(52) U.S. Cl.
CPC .......... *H01G 4/012* (2013.01); *H01G 4/1227* (2013.01); *H01G 4/232* (2013.01); *H01G 4/248* (2013.01); *H01G 4/30* (2013.01); *H01G 4/385* (2013.01)

(58) Field of Classification Search
CPC ...................................................... H01G 4/30
USPC ...................... 361/301.4, 328–330
See application file for complete search history.

(56) References Cited

U.S. PATENT DOCUMENTS

| | | | |
|---|---|---|---|
| 2009/0161292 A1* | 6/2009 | Kim | H01G 4/012 361/321.2 |
| 2010/0033896 A1* | 2/2010 | Togashi | H01G 4/385 361/328 |
| 2014/0285944 A1 | 9/2014 | Sato | |

FOREIGN PATENT DOCUMENTS

| | | | |
|---|---|---|---|
| JP | 63-112325 U | | 7/1988 |
| JP | 63112325 U | * | 7/1988 |
| JP | 09-215324 A | | 8/1997 |
| JP | 2010-045103 A | | 2/2010 |
| JP | 2013-093363 A | | 5/2013 |

(Continued)

OTHER PUBLICATIONS

Official Communication issued in corresponding Japanese Patent Application No. 2014-097516, mailed on Oct. 4, 2016.

*Primary Examiner* — Eric Thomas
(74) *Attorney, Agent, or Firm* — Keating & Bennett, LLP

(57) ABSTRACT

A multilayer capacitor includes a multilayer body including a dielectric layer, first through third inner electrodes, and first and second capacitor sections, and first through third outer electrodes on surfaces of the multilayer body. The first capacitor section is electrically connected between the first and second outer electrodes. The second capacitor section is electrically connected between the second and third outer electrodes. The first, second, and third inner electrodes are connected to the first, second, and third outer electrodes, respectively. The first and third inner electrodes oppose each other with the dielectric layer therebetween, thus defining the first capacitor section. The second and third inner electrodes oppose each other with the dielectric layer therebetween, thus defining the second capacitor section.

20 Claims, 13 Drawing Sheets

(56) References Cited

FOREIGN PATENT DOCUMENTS

JP        2013-258278  A    12/2013

\* cited by examiner

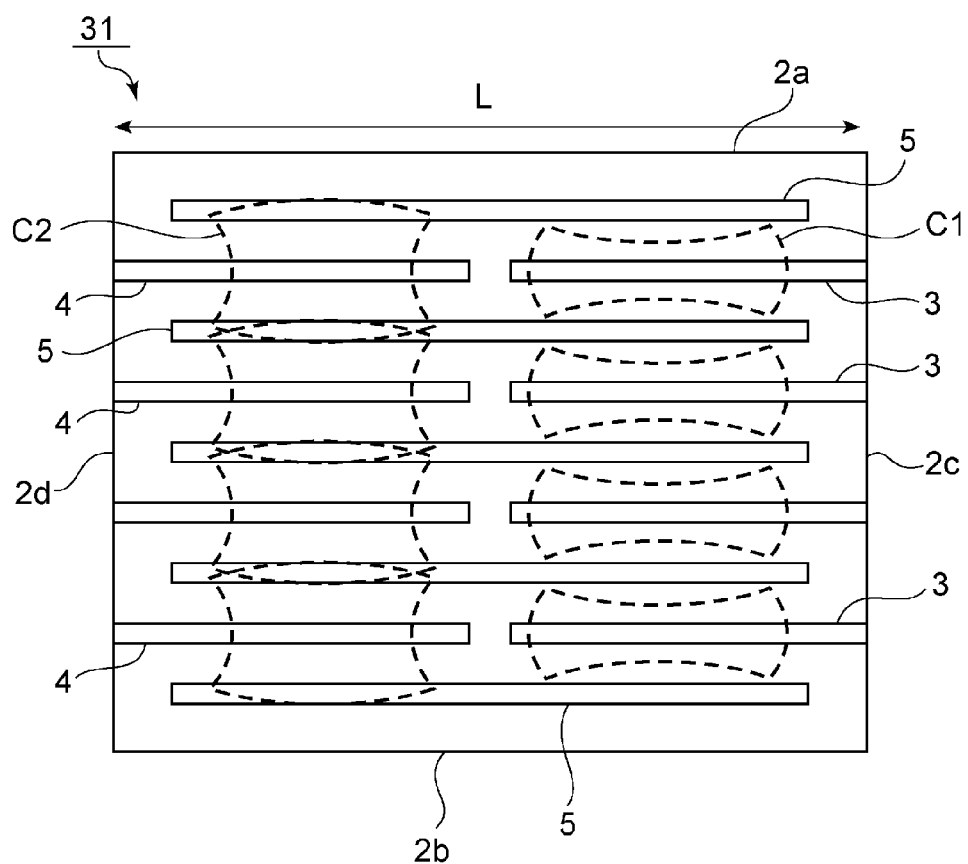

MULTILAYER CAPACITOR AND USAGE METHOD THEREFOR

BACKGROUND OF THE INVENTION

1. Field of the Invention

The present invention relates to a multilayer capacitor including a plurality of capacitor sections and to a usage method for this multilayer capacitor.

2. Description of the Related Art

Ceramics having a high dielectric constant have piezoelectricity and electrostriction. Accordingly, in a multilayer capacitor using ceramics having a high dielectric constant, vibration occurs due to a mechanical distortion if a direct current (DC) voltage on which an alternating current (AC) voltage or an AC component is superposed is applied to the multilayer capacitor. If this vibration is transmitted to a circuit board, the circuit board vibrates, which may cause noise called "acoustic noise". Japanese Unexamined Patent Application Publication No. 2013-258278 discloses a structure in which the occurrence of acoustic noise can be reduced. In the multilayer capacitor disclosed in Japanese Unexamined Patent Application Publication No. 2013-258278, within a multilayer body, first and second capacitor sections are disposed adjacent to each other in the stacking direction of the multilayer body. In the first capacitor section, first and third inner electrodes are stacked on each other with a dielectric layer therebetween. In the second capacitor section, second and third inner electrodes are stacked on each other with the dielectric layer therebetween. By driving the first and second capacitor sections in the opposite phases, the expansion and contraction in the first capacitor section and that in the second capacitor section cancel each other out.

However, even by the use of the multilayer capacitor disclosed in Japanese Unexamined Patent Application Publication No. 2013-258278, noise still occurs from time to time.

SUMMARY OF THE INVENTION

Accordingly, preferred embodiments of the present invention provide a multilayer capacitor in which the occurrence of noise is effectively reduced or prevented, and also provide a usage method for this multilayer capacitor.

According to a preferred embodiment of the present invention, a multilayer capacitor includes a multilayer body and a plurality of outer electrodes. The multilayer body includes a dielectric layer, inner electrodes and first and second capacitor sections. The inner electrode includes first, second, and third inner electrodes. The first capacitor section is connected to a circuit configured to provide voltage smoothing. The plurality of outer electrodes are disposed on surfaces of the multilayer body and include first, second, and third outer electrodes. The first capacitor section is electrically connected between the first and second outer electrodes. The second capacitor section, which decreases a potential difference applied to the first capacitor section, is electrically connected between the second and third outer electrodes. The first, second, and third inner electrodes in the multilayer body are connected to the first, second, and third outer electrodes, respectively. The first and third inner electrodes oppose each other with the dielectric layer therebetween so as to define the first capacitor section. The second and third inner electrodes oppose each other with the dielectric layer therebetween so as to define the second capacitor section. The first inner electrode has a greater electrode area than that of the second inner electrode. An area by which the first and third inner electrodes oppose each other is different from an area by which the second and third inner electrodes oppose each other.

In the multilayer capacitor, the first and second capacitor sections preferably are disposed in a stacking direction of the multilayer body.

In the multilayer capacitor, in the stacking direction, at least one first capacitor section preferably is positioned between a pair of the second capacitor sections, and at least one second capacitor section preferably is positioned between a pair of the first capacitor sections.

In the multilayer capacitor, the first and second capacitor sections preferably are disposed in a direction perpendicular or substantially perpendicular to the stacking direction.

In the multilayer capacitor, the first and second capacitor sections preferably are disposed in a direction perpendicular or substantially perpendicular to a direction in which the first and second outer electrodes oppose each other.

According to another preferred embodiment of the present invention, a multilayer capacitor includes a multilayer body and first, second, and third outer electrodes disposed on surfaces of the multilayer body. In the multilayer body, a dielectric layer and first, second, and third inner electrodes are stacked on each other. The first and second inner electrodes are positioned within the same plane in the multilayer body which is perpendicular or substantially perpendicular to a stacking direction of the multilayer body. The third inner electrode is positioned within a plane in the multilayer body which is perpendicular or substantially perpendicular to the stacking direction and which is different from the plane within which the first and second inner electrodes are positioned. A first capacitor section is defined by a portion in which the first and third inner electrodes oppose each other with a portion of the dielectric layer therebetween. A second capacitor section is defined by a portion in which the second and third inner electrodes oppose each other with a portion of the dielectric layer therebetween. The first, second, and third outer electrodes are electrically connected to the first, second, and third inner electrodes, respectively.

In the multilayer capacitor, the multilayer body preferably includes first and second principal surfaces opposing each other in the stacking direction, first and second side surfaces which oppose each other and which connect the first and second principal surfaces and are perpendicular or substantially perpendicular to the first and second principal surfaces, and third and fourth side surfaces which oppose each other and which are perpendicular or substantially perpendicular to the first and second principal surfaces and to the first and second side surfaces. The first inner electrode preferably extends out to the first side surface. The second inner electrode preferably extends out to the second side surface. The first and second inner electrodes preferably are separated from each other in a direction in which the third and fourth side surfaces are connected. The third inner electrode preferably extend out to the third or fourth side surface.

In the multilayer capacitor, the multilayer body preferably includes first and second principal surfaces opposing each other in the stacking direction, first and second side surfaces which oppose each other and which connect the first and second principal surfaces and are perpendicular or substantially perpendicular to the first and second principal surfaces, and third and fourth side surfaces which oppose each other and which are perpendicular or substantially perpendicular to the first and second principal surfaces and to the first and second side surfaces. The first inner electrode preferably extends out to the first side surface. The second inner electrode preferably extends out to the second side surface. The first and second inner electrodes preferably are separated from each other in a direction in which the first and second side surfaces are connected. The third inner electrode preferably extends out to the third or fourth side surface.

In the multilayer capacitor, at least one first inner electrode preferably is located closer to the third side surface than a second inner electrode positioned within the same plane as a plane within which the at least one first inner electrode is positioned. At least one second inner electrode positioned within a plane different from the plane within which the at least one first inner electrode is positioned preferably is located closer to the third side surface than a first inner electrode positioned within the same plane as the plane in which the at least one second inner electrode is positioned.

In the multilayer capacitor, in the multilayer body, a first stacked portion in which the first, second, and third inner electrodes are stacked on each other at a position close to the third side surface and a second stacked portion in which the first, second, and third inner electrodes are stacked on each other at a position close to the fourth side surface preferably are provided. In the first stacked portion, the third inner electrode, the first inner electrode, the third inner electrode, and the second inner electrode preferably are repeatedly stacked on each other in this order. In the second stacked portion, the third inner electrode, the second inner electrode, the third inner electrode, and the first inner electrode preferably are repeatedly stacked on each other in this order.

In the multilayer capacitor, at least one third inner electrode preferably includes an area sandwiched between the first inner electrode and the second inner electrode in the stacking direction.

In the multilayer capacitor, an area by which the first and third inner electrodes oppose each other preferably is greater than an area by which the second and third inner electrodes oppose each other.

In the multilayer capacitor, the first outer electrode preferably is disposed on the first side surface, the second outer electrode preferably is disposed on the second side surface, and the third outer electrode preferably is disposed at least one of the third and fourth side surfaces.

In the multilayer capacitor, the first and second inner electrodes preferably include an overlapping portion each other in the stacking direction.

According to another preferred embodiment of the present invention, a usage method for the multilayer capacitor according to a preferred embodiment of the present invention is provided. In this usage method, a voltage is applied to the multilayer capacitor such that, if a potential difference of a voltage applied to the first capacitor section is increased or decreased, a potential difference of a voltage applied to the second capacitor section is decreased or increased.

By using the multilayer capacitor and a usage method therefor according to preferred embodiments of the present invention, even under the application of a DC voltage on which an AC voltage or an AC component is superposed, it is possible to effectively reduce or prevent the occurrence of noise.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 11 is a schematic cross sectional view illustrating the expansion and contraction of first and second capacitor sections of the multilayer capacitor of the third preferred embodiment of the present invention.

DETAILED DESCRIPTION OF THE PREFERRED EMBODIMENTS

The present invention will be described below through illustration of specific preferred embodiments with reference to the accompanying drawings.

Figure 1:
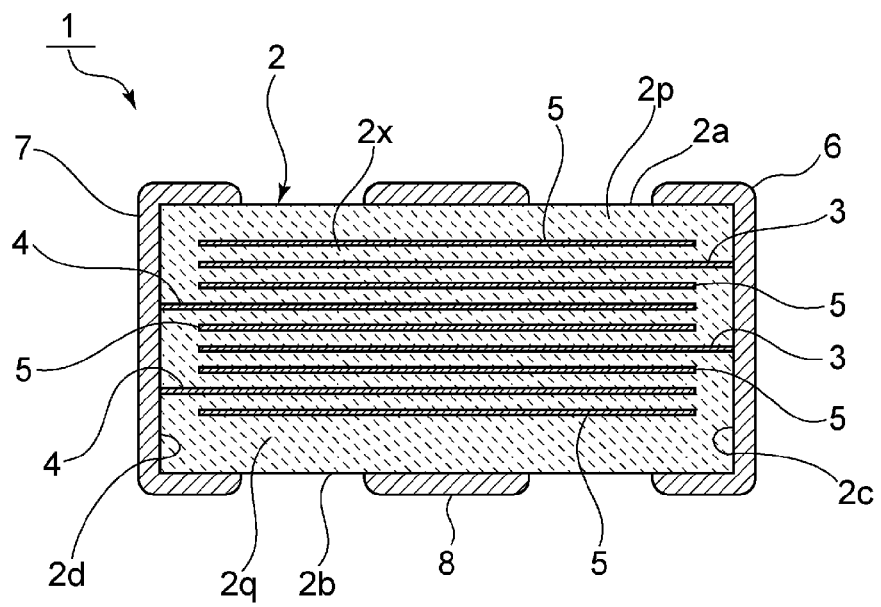
FIG. 1 is a front sectional view of a multilayer capacitor according to a first preferred embodiment of the present invention.
Figure 2A:
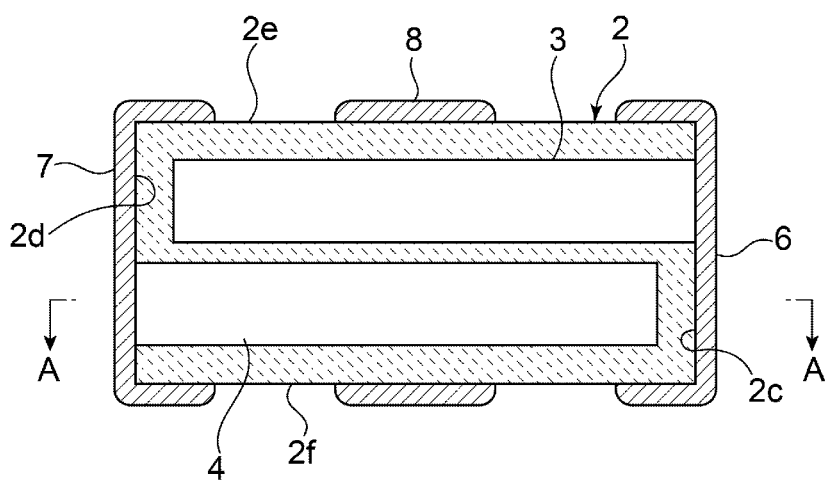
FIGS. 2A, 2B, and 2C are plane sectional views of the multilayer capacitor of the first preferred embodiment of the present invention.
Figure 2B:
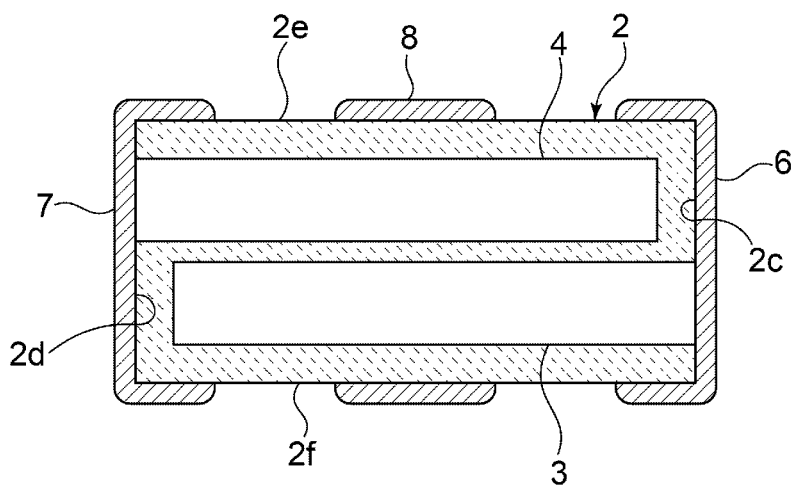
Figure 2C:
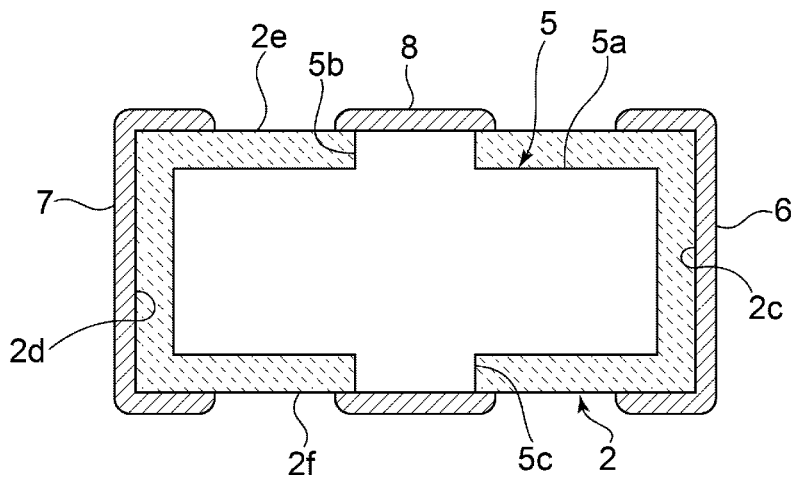
Figure 3:
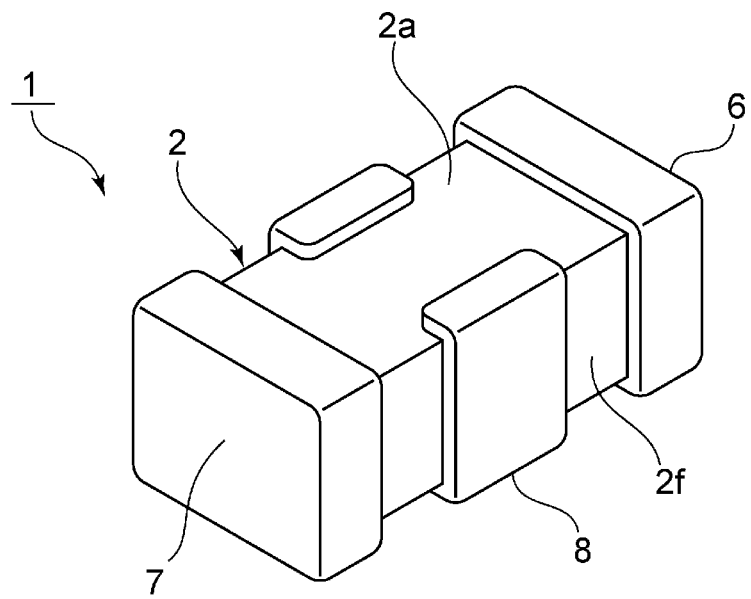
FIG. 3 is a perspective view of the outer appearance of the multilayer capacitor of the first preferred embodiment of the present invention.

FIG. 1 is a front sectional view of a multilayer capacitor 1 according to a first preferred embodiment of the present invention. FIGS. 2A, 2B, and 2C are plane sectional views of the multilayer capacitor 1 of the first preferred embodiment. FIG. 3 is a perspective view of the outer appearance of the multilayer capacitor 1 of the first preferred embodiment.

The multilayer capacitor 1 includes a multilayer body 2 preferably with a rectangular or substantially rectangular parallelepiped shape. In the multilayer body 2, a dielectric layer 2x, first inner electrodes 3, second inner electrodes 4, and third inner electrodes 5 are stacked on each other in a stacking direction.

The multilayer body 2 includes first and second principal surfaces 2a and 2b opposing each other in the stacking direction. The multilayer body 2 also includes first and second side surfaces 2c and 2d which oppose each other and which are perpendicular or substantially perpendicular to the first and second principal surfaces 2a and 2b. The multilayer body 2 also includes third and fourth side surfaces 2e and 2f which oppose each other and which are perpendicular or substantially perpendicular to the first and second principal surfaces 2a and 2b and the first and second side surfaces 2c and 2d. In the preferred embodiments of the present invention, the direction in which the first and second side surfaces 2c and 2d are connected is the longitudinal direction, and the direction in which the third and fourth side surfaces 2e and 2f are connected is the widthwise direction. The dimension of the widthwise direction is shorter than that of the longitudinal direction. The area of each of the first and second side surfaces 2c and 2d is smaller than that of each of the first and second principal surfaces 2a and 2b and is also smaller than that of each of the third and fourth side surfaces 2e and 2f.

As shown in FIG. 1, the first inner electrode 3 opposes the third inner electrode 5 with the dielectric layer 2x therebetween. In the multilayer body 2, there are a plurality of portions in which the first and third inner electrodes 3 and 5 are stacked on each other with the dielectric layer 2x therebetween. First capacitor sections are constituted by these portions.

The second and third inner electrodes 4 and 5 are also stacked on each other with the dielectric layer 2x therebetween. Second capacitor sections are constituted by a plurality of portions in which the second and third inner electrodes 4 and 5 are stacked on each other with the dielectric layer 2x therebetween.

In a plane at the heightwise position shown in FIG. 2A, the first inner electrode 3 is disposed close to the third side surface 2e, while the second inner electrode 4 is disposed close to the fourth side surface 2f. The first inner electrode 3 extends out to the first side surface 2c and also extends toward but does not reach the second side surface 2d. Conversely, the second inner electrode 4 extends out to the second side surface 2d and also extends toward but does not reach the first side surface 2c. As shown in FIG. 2A, the first and second inner electrodes 3 and 4 preferably have substantially a narrow rectangular shape, that is, a substantially strip-shaped flat configuration. More specifically, the ratio of the longitudinal dimension to the widthwise dimension of the first and second inner electrodes 3 and 4 is greater than that of the multilayer body 2.

FIG. 2B illustrates the first and second inner electrodes 3 and 4 in a plane at a heightwise position different from that shown in FIG. 2A. At this heightwise position, the first inner electrode 3 is disposed close to the fourth side surface 2f, while the second inner electrode 4 is disposed close to the third side surface 2e.

As shown in FIG. 2C, the third inner electrode 5 has an inner electrode body 5a preferably with a rectangular or substantially rectangular shape and extended portions 5b and 5c extending from the inner electrode body 5a to the third and fourth side surfaces 2e and 2f, respectively. The third inner electrode 5 reaches neither the first side surface 2c nor the second side surface 2d. The inner electrode body 5a opposes each of the first and second inner electrodes 3 and 4 with the dielectric layer 2x therebetween. A portion in which the third inner electrode 5 opposes the first inner electrode 3 defines a first capacitor section, and a portion in which the third inner electrode 5 opposes the second inner electrode 4 defines a second capacitor section.

Accordingly, in the multilayer capacitor 1 of the first preferred embodiment, the first and second inner electrodes 3 and 4 are disposed in the same plane perpendicular or substantially perpendicular to the stacking direction of the multilayer body 2.

FIG. 1 is a sectional view taken along line A-A of FIG. 2A. That is, FIG. 1 is a front sectional view of the multilayer body 2 as viewed from the fourth side surface 2f. In this sectional view, a third inner electrode 5 is disposed at the topmost layer, and then, a first inner electrode 3, a third inner electrode 5, and a second inner electrode 4 are disposed with the dielectric layer 2x therebetween in this order in the downward direction. Thus, a third inner electrode 5, a first inner electrode 3, a third inner electrode 5, and a second inner electrode 4 are repeatedly stacked on each other in this order.

Conversely, on the third side surface 2e, from the top to the bottom, a third inner electrode 5, a second inner electrode 4, a third inner electrode 5, and a first inner electrode 3 are repeatedly stacked on each other in this order.

On the first side surface 2c of the multilayer body 2, a first outer electrode 6 is disposed. The first outer electrode 6 entirely covers the first side surface 2c and partially covers the first and second principal surfaces 2a and 2b and the third and fourth side surfaces 2e and 2f.

On the second side surface 2d of the multilayer body 2, a second outer electrode 7 is disposed. The second outer electrode 7 entirely covers the second side surface 2d and partially covers the first and second principal surfaces 2a and 2b and the third and fourth side surfaces 2e and 2f.

A pair of third outer electrodes 8 are disposed separately from each other substantially at the center of the longitudinal direction such that they cover the third and fourth side surfaces 2e and 2f. Alternatively, one outer electrode 8 may be disposed such that it extends from the third side surface 2e to the fourth side surface 2f via the second principal surface 2b.

The dielectric layer 2x of the multilayer body 2 is made of a suitable type of dielectric ceramics. As stated above, by the use of ceramics having a high dielectric constant, noise called "acoustic noise" occurs. In a preferred embodiment of the present invention, the occurrence of such noise is effectively reduced even though ceramics having a high dielectric constant is used. A non-limiting example of ceramics having a high dielectric constant is barium titanate ceramics.

The first, second, and third inner electrodes 3, 4, and 5 may be configured of a suitable metal or alloy. The first, second, and third outer electrodes 6, 7, and 8 may also be configured of a suitable metal or alloy.

The multilayer capacitor 1 may be manufactured as follows. A conductive paste for forming the first through third inner electrodes 3 through 5 is printed on ceramic green sheets including the above-described dielectric ceramics, and then, the green ceramic sheets are stacked on each other, thus forming a mother multilayer body. This mother multilayer body is cut into individual multilayer bodies in the size of the multilayer capacitor 1, thus forming multilayer chips. Each of the multilayer chips is fired, and then, the multilayer body 2 is formed. Thereafter, a conductive paste is applied to the outer surface of the multilayer body 2 and is baked, thus forming the first through third outer electrodes 6 through 8.

Prior to the firing of the multilayer chip, a conductive paste may be applied to the outer surface of the multilayer chip, and the multilayer chip may be fired and the conductive paste may be baked at the same time, thus forming the first through third outer electrodes 6 through 8.

Figure 4:
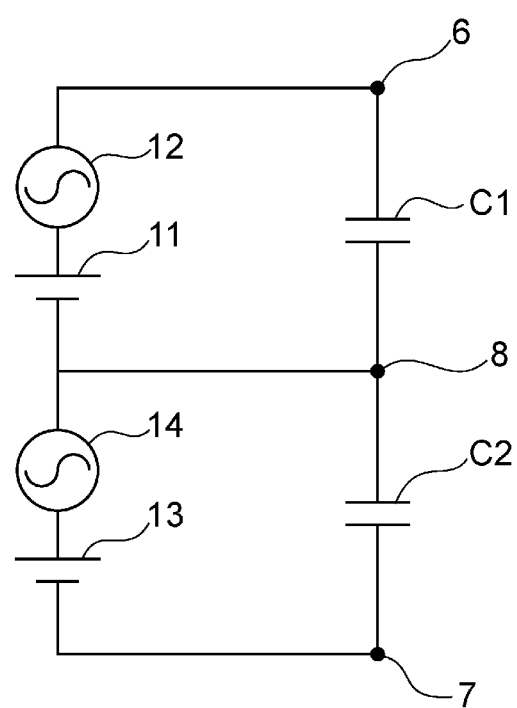
FIG. 4 is a circuit diagram illustrating a usage method for the multilayer capacitor of the first preferred embodiment of the present invention.

When driving the multilayer capacitor 1 of the first preferred embodiment, even under the application of a DC voltage on which an AC voltage or an AC component is superposed to the multilayer capacitor 1, the occurrence of noise called "acoustic noise" is effectively reduced. This will be explained with reference to FIGS. 4 and 5. FIG. 4 is a circuit diagram illustrating a usage method for the multilayer capacitor 1. A first capacitor section C1 and a second capacitor section C2 of the multilayer capacitor 1 are connected in series with each other. That is, the first outer electrode 6 is connected to one end of the first capacitor section C1, while the second outer electrode 7 is connected to one end of the second capacitor section C2. The other ends of the first and second capacitor sections C1 and C2 are connected to the third outer electrode 8.

A DC voltage is applied between the first outer electrode 6 and the third outer electrode 8 by using a first DC power supply 11. In this case, it is assumed that the third outer electrode 8 is used as a ground potential. An AC component 12 is superposed on the DC signal supplied from the first DC power supply 11. The AC component 12 is a ripple component generated due to a fluctuation in the load. For the sake of description, the symbol of an AC power supply is used for the AC component 12 in FIG. 4.

A DC voltage is applied to the second capacitor section C2 by using a second DC power supply 13. It is assumed that an AC component 14 is also superposed on this DC voltage.

It is preferable that the phase difference between the AC component 12 superposed on the DC voltage V1 of the first DC power supply 11 and the AC component 14 superposed on the DC voltage V2 of the second DC power supply 13 be about 90°, 180°, or 270°. With this arrangement, it is possible that the expansion and contraction of the first capacitor section C1 and that of the second capacitor section C2 effectively cancel each other out.

Figure 5:
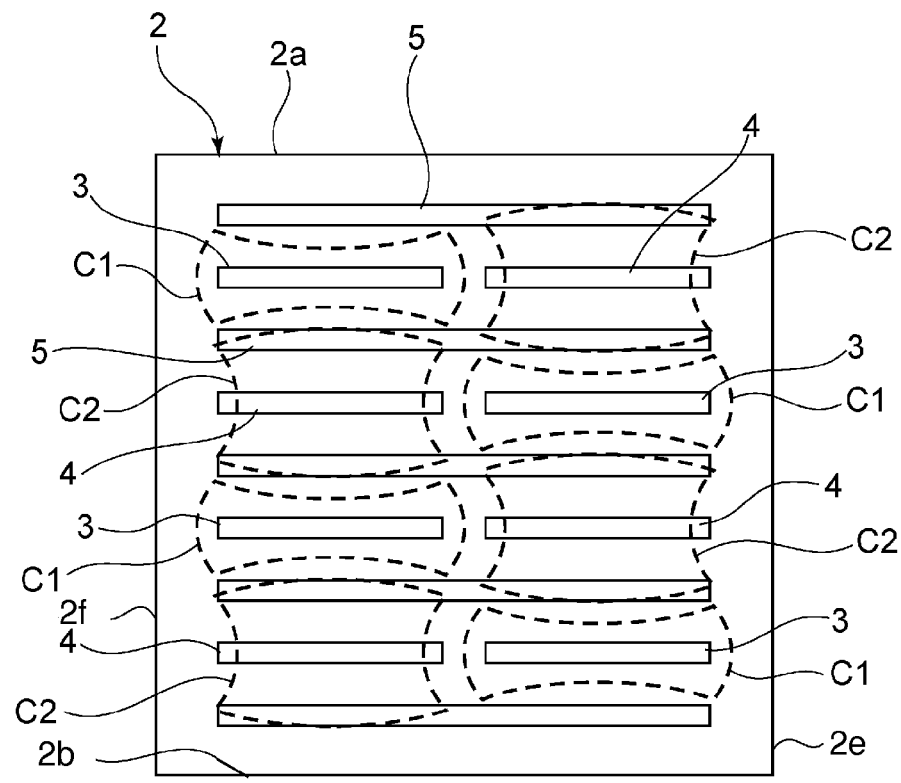
FIG. 5 is a schematic sectional view illustrating the expansion and contraction of first and second capacitor sections of the multilayer capacitor of the first preferred embodiment of the present invention.

As shown in the schematic sectional view of FIG. 5, in the first preferred embodiment, the expansion and contraction of a first capacitor section C1 and that of an adjacent second capacitor section C2 effectively cancel each other out and also constrain each other. As shown in FIG. 5, the first capacitor section C1 is provided at a portion in which the third inner electrodes 5 and the first inner electrode 3 are stacked on each other with the dielectric layer therebetween, and the second capacitor section C2 is provided at a portion in which the third inner electrodes 5 and the second inner electrode 4 are stacked on each other with the dielectric layer therebetween. Accordingly, a plurality of first capacitor sections C1 and a plurality of second capacitor sections C2 are provided.

Since the first and second inner electrodes 3 and 4 are located in the same heightwise plane, the first and second capacitor sections C1 and C2 are located adjacent to each other on the same plane level, that is, in the direction parallel with the first and second principal surfaces 2a and 2b. The first and second capacitor sections C1 and C2 are also located adjacent to each other in the stacking direction.

When the first capacitor section C1 contracts in the thickness direction (stacking direction), as shown in FIG. 5, it is displaced at both end portions of the widthwise direction such that the center portions of the end portions expand outwardly. At this time, since the second capacitor section C2 is driven in the opposite phase, it expands in the stacking direction and it contracts inwardly at both end portions of the widthwise direction.

As discussed above, the first and second capacitor sections C1 and C2 adjacent to each other in the stacking direction expand and contract in the opposite directions. Accordingly, the expansion and contraction of the first capacitor section C1 and that of the second capacitor section C2 cancel each other out. This makes it possible to effectively reduce the distortion of the multilayer capacitor 1 in the stacking direction.

Additionally, concerning the first and second capacitor sections C1 and C2 adjacent to each other in the widthwise direction, at adjacent end portions of the first and second capacitor sections C1 and C2 in the widthwise direction, the expansion and contraction of the first capacitor section C1 and that of the second capacitor section C2 constrain each other. Concerning the first and second capacitor sections C1 and C2 adjacent to each other in the stacking direction, too, at end portions of the first and second capacitor sections C1 and C2 in the widthwise direction, the expansion and contraction of the first capacitor section C1 and that of the second capacitor section C2 are opposite to each other and thus constrain each other.

As described above, at portions at which the first and second capacitor sections C1 and C2 are adjacent to each other, the expansion and contraction of the first capacitor section C1 and that of the second capacitor section C2 cancel each other out and constrain each other, thus effectively reducing the distortion of the multilayer body 2 as a whole. Accordingly, when the multilayer capacitor 1 is mounted on a circuit board, vibration caused by an AC component superposed on a DC voltage is unlikely to occur, thus effectively reducing noise called "acoustic noise".

The areas of the first and second side surfaces 2c and 2d are smaller than those of the third and fourth side surfaces 2e and 2f. Accordingly, the expansion and contraction of the first and second side surfaces 2c and 2d is greater than that of the third and fourth side surfaces 2e and 2f. In the first preferred embodiment, however, as viewed from the first and second side surfaces 2c and 2d, the capacitor is divided into the first and second capacitor sections C1 and C2 in the widthwise direction. Thus, the expansion and contraction of the first and second side surfaces 2c and 2d may be relaxed, thus effectively reducing the occurrence of noise.

In the first preferred embodiment, as shown in FIG. 1, a dielectric layer 2p is disposed above a portion from which electrostatic capacity is obtained, and a dielectric layer 2q is disposed under a portion from which electrostatic capacity is obtained. The dielectric layers 2p and 2q define outer dielectric layers. Preferably, the dielectric layer 2q is thicker than the dielectric layer 2p, as in the first preferred embodiment. This makes it possible to further reduce the occurrence of "acoustic noise" when the multilayer capacitor 1 is mounted with the second principal surface 2b on a circuit board.

Figure 6:
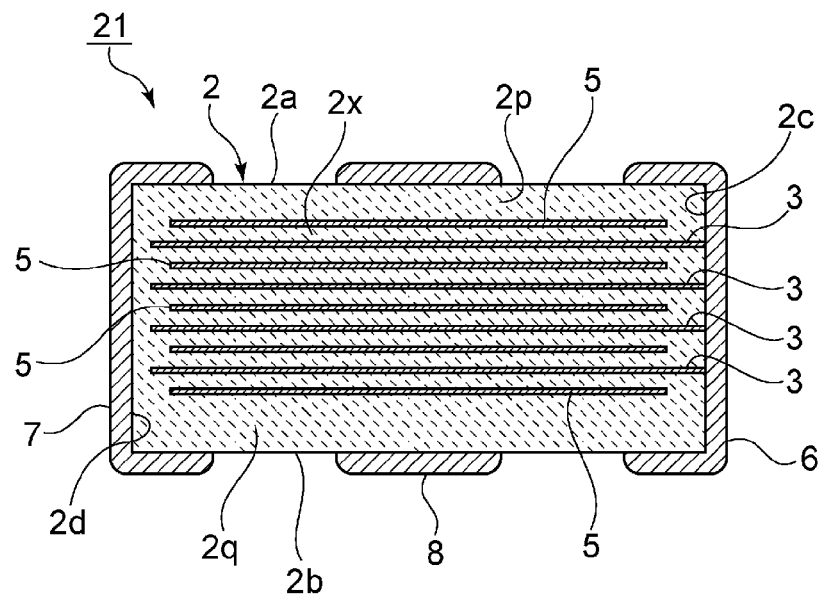
FIG. 6 is a front sectional view of a multilayer capacitor according to a second preferred embodiment of the present invention.
Figure 7:
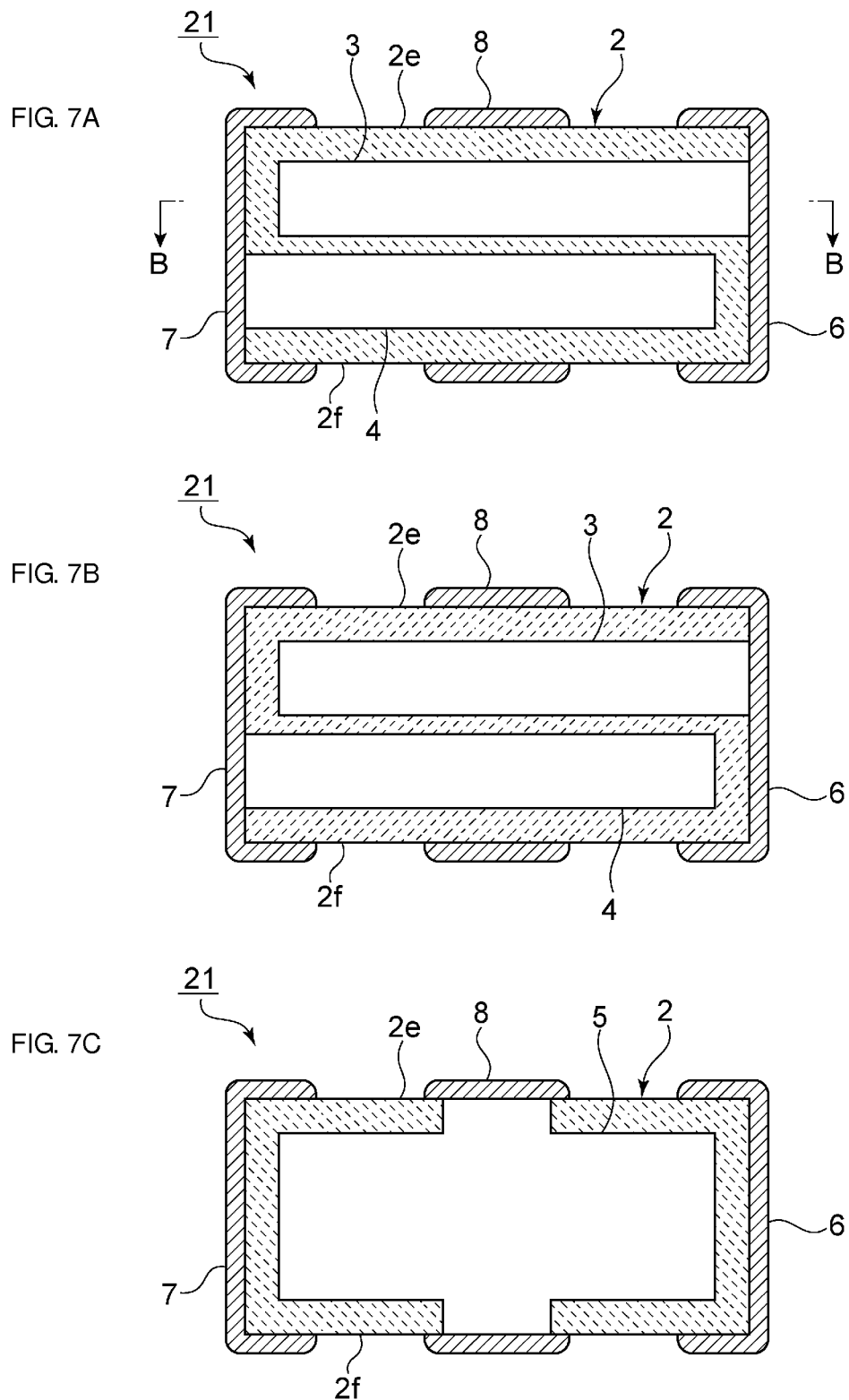
FIGS. 7A, 7B, and 7C are plane sectional views of the multilayer capacitor of the second preferred embodiment of the present invention.

FIG. 6 is a front sectional view of a multilayer capacitor 21 according to a second preferred embodiment of the present invention. FIGS. 7A, 7B, and 7C are plane sectional views of the multilayer capacitor 21 of the second preferred embodiment. FIG. 6 is a front sectional view taken along line B-B of FIG. 7A.

As in the first preferred embodiment, in the multilayer body 2 of the multilayer capacitor 21 of the second preferred embodiment, a dielectric layer 2x, first inner electrodes 3, second inner electrodes 4, and third inner electrodes 5 are stacked on each other. However, in the multilayer body 2 of the second preferred embodiment, the stacking mode is different from that of the first preferred embodiment.

As shown in FIG. 6, a third inner electrode 5 is disposed at the topmost layer. Under this third inner electrode 5, a first inner electrode 3 is stacked on the third inner electrode 5 with the dielectric layer 2x therebetween. Under this first inner electrode 3, a third inner electrode 5 and a first inner electrode are stacked on each other with the dielectric layer 2x therebetween. In this manner, as shown in FIG. 6, third inner electrodes 5 and first inner electrodes 3 are alternately stacked on each other in the stacking direction.

At a cross section taken along line B-B of FIG. 7A, third inner electrodes 5 and first inner electrodes 3 are alternately stacked on each other in the stacking direction. In a plane at a heightwise direction, as shown in FIG. 7B, a first inner electrode 3 and a second inner electrode 4 are located adjacent to each other in the widthwise direction in which the third and fourth side surfaces 2e and 2f are connected to each other. At a position at which the second inner electrode 4 is disposed, third inner electrodes 5 are disposed above and under the second inner electrode 4 with the dielectric layer 2x therebetween. That is, at a position at which the second inner electrode 4 is disposed, second inner electrodes 4 and third inner electrodes 5 are alternately stacked on each other in the stacking direction.

Figure 8:
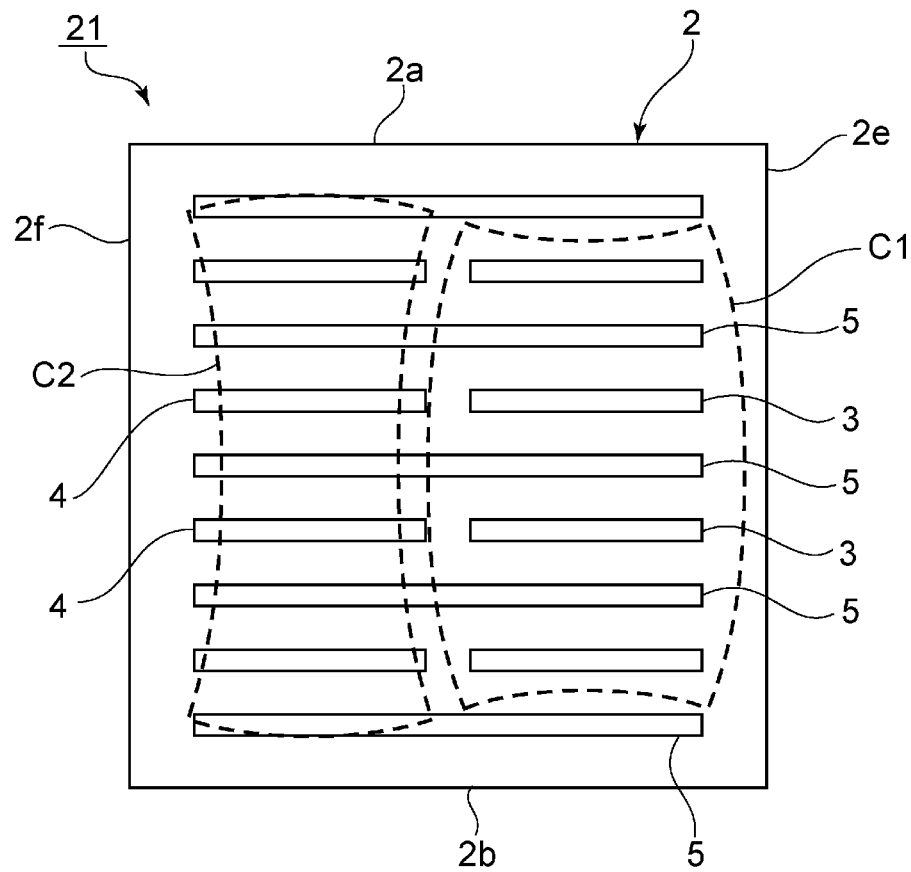
FIG. 8 is a schematic cross sectional view illustrating the expansion and contraction of first and second capacitor sections of the multilayer capacitor of the second preferred embodiment of the present invention.

FIG. 8 is a schematic cross sectional view illustrating the expansion and contraction of the first capacitor section C1 and the second capacitor section C2 of the multilayer capacitor 21 of the second preferred embodiment.

As in the first preferred embodiment, first, second, and third outer electrodes 6, 7, and 8 are disposed on the outer surfaces of the multilayer body 2 of the multilayer capacitor 21.

The multilayer capacitor 21 of the second preferred embodiment is similar to the multilayer capacitor 1 of the first preferred embodiment, except that the first and second inner electrodes 3 and 4 are located at different positions from those of the first preferred embodiment. Thus, the same elements as those of the first preferred embodiment are designated by like reference numerals, and an explanation thereof will be omitted.

As in the second preferred embodiment, the third inner electrodes 5 and the first inner electrodes 3 may be disposed closer to the third side surface 2e and be alternately stacked on each other in the stacking direction, while the second inner electrodes 4 and the third inner electrodes 5 may be disposed closer to the fourth side surface 2f and be alternately stacked on each other in the stacking direction.

Accordingly, as shown in FIG. 8, a first capacitor section C1 is closer to the third side surface 2e, while a second capacitor section C2 is closer to the fourth side surface 2f.

In the second preferred embodiment, as well as in the first preferred embodiment, it is preferable that the phase of an AC component superposed on a voltage applied to the first capacitor section C1 be displaced from that applied to the second capacitor section C2 by about 90°, 180°, or 270°. With this arrangement, it is possible that the expansion and contraction of the first capacitor section C1 and that of the second capacitor section C2 be opposite to each other and effectively cancel each other out. That is, as schematically shown in FIG. 8, the first capacitor section C1 contracts in the stacking direction and expands outwardly at the central portions of both end portions of the widthwise direction. In contrast, the second capacitor section C2 expands in the stacking direction and contracts inwardly at the central portions of both end portions of the widthwise direction.

Accordingly, at portions at which the first and second capacitor sections C1 and C2 are adjacent to each other, the expansion and contraction of the first capacitor section C1 and that of the second capacitor section C2 cancel each other out, thus effectively reducing the distortion of the multilayer capacitor 21 as a whole.

Figure 9:
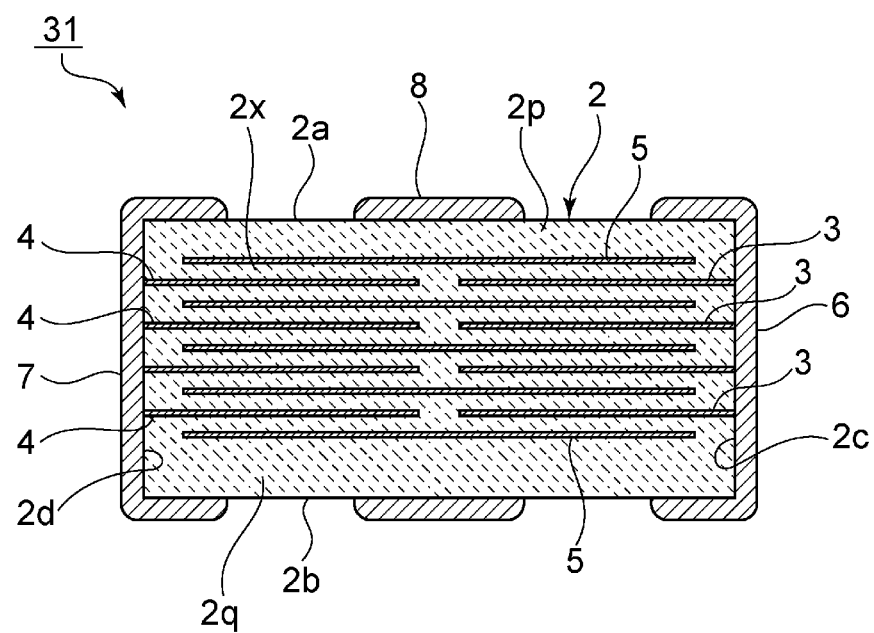
FIG. 9 is a front sectional view of a multilayer capacitor according to a third preferred embodiment of the present invention.
Figure 10A:
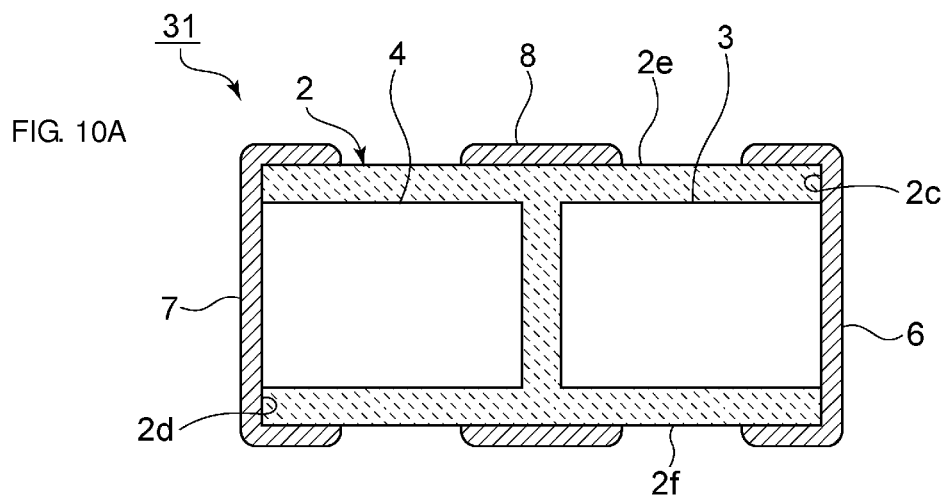
FIGS. 10A, 10B, and 10C are plane sectional views of the multilayer capacitor of the third preferred embodiment of the present invention.
Figure 10B:
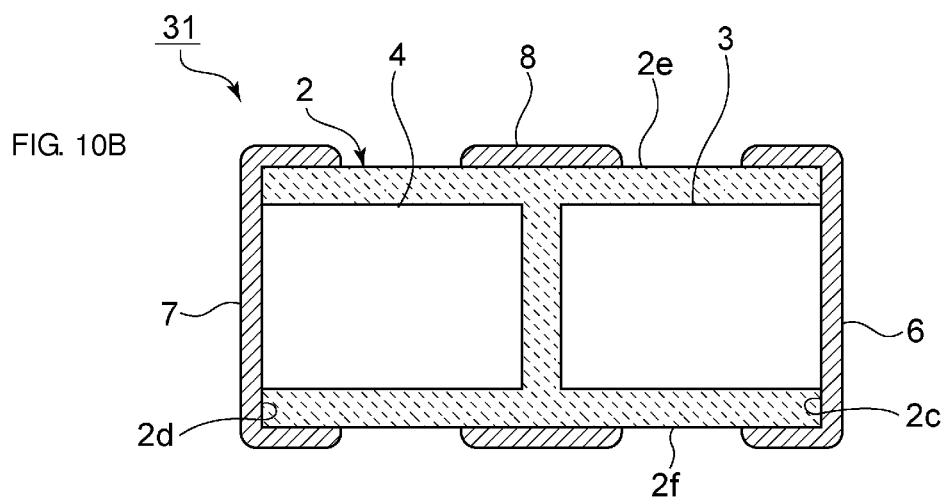
Figure 10C:
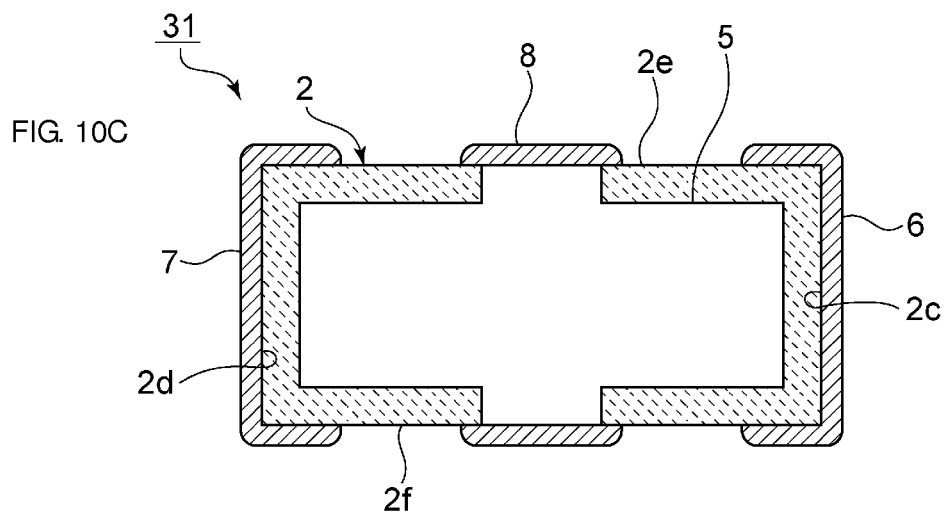

FIG. 9 is a front sectional view of a multilayer capacitor 31 according to a third preferred embodiment of the present invention. FIGS. 10A, 10B, and 10C are plane sectional views of the multilayer capacitor 31 located at different heightwise positions.

The multilayer capacitor 31 of the third preferred embodiment includes a multilayer body 2 and first through third outer electrodes 6 through 8. In the multilayer body 2, first inner electrodes 3, second inner electrodes 4, third inner electrodes 5, and a dielectric layer 2x are stacked on each other. The multilayer capacitor 31 is configured similarly to the multilayer capacitor 1 of the first preferred embodiment, except that the stacking mode of the multilayer body 2 is different from that of the first preferred embodiment. Thus, the same elements as those of the first preferred embodiment are designated by like reference numerals, and an explanation thereof will be omitted.

FIGS. 10A and 10B illustrate first inner electrodes 3 and second inner electrodes 4 within planes at different heightwise positions. At the heightwise position shown in FIG. 10A, a first inner electrode 3 and a second inner electrode 4 are located within a plane at the same heightwise position. More specifically, the first inner electrode 3 extends from substantially the center of the multilayer body 2 to the first side surface 2c in the longitudinal direction, while the second inner electrode 4 extends from substantially the center of the multilayer body 2 to the second side surface 2d in the longitudinal direction. In the third preferred embodiment, the first and second inner electrodes 3 and 4 preferably have a rectangular or substantially rectangular flat shape, though the configuration thereof is not particularly restricted. The inner side portion of the first inner electrode 3 and that of the second inner electrode 4 are separated from each other with a gap therebetween in the longitudinal direction. This gap overlaps the third outer electrodes 8 in the longitudinal direction.

At the heightwise position shown in FIG. 10B different from that shown in FIG. 10A, the first inner electrode 3 and the fourth inner electrode 4 are disposed within the same plane, in a manner similar to FIG. 10A.

As shown in FIG. 10C, the third inner electrode 5 is configured similarly to that of the first preferred embodiment.

As shown in the front sectional view of FIG. 9, in the third preferred embodiment, first and second inner electrodes 3 and 4 are stacked on a third inner electrode 5 with the dielectric layer 2x therebetween. That is, the multilayer structure of the multilayer capacitor 31 is such that a third inner electrode 5, a pair of first and second inner electrodes 3 and 4, and a third inner electrode 5 are repeatedly stacked on each other in the stacking direction.

Accordingly, as shown in the schematic sectional view of FIG. 11, in the third preferred embodiment, a first capacitor section C1 and a second capacitor section C2 are located adjacent to each other in the longitudinal direction in which the first and second side surfaces 2c and 2d are connected to each other. That is, the first capacitor section C1 and the second capacitor section C2 are adjacent to each other in the longitudinal direction of the multilayer body 2.

In the third preferred embodiment, as well as in the first and second preferred embodiments, it is preferable that the phase of an AC voltage or an AC component superposed on a voltage applied to the first capacitor section C1 be displaced from that applied to the second capacitor section C2 by about 90°, 180°, or 270°. With this arrangement, it is possible that the expansion and contraction of the first capacitor section C1 and that of the second capacitor section C2 effectively cancel each other out and also constrain each other, as discussed in the first preferred embodiment, thus reducing the distortion of the multilayer capacitor 31. In FIG. 11, the first capacitor sections C1 contract in the stacking direction, while the second capacitor sections C2 expand in the stacking direction, as indicated by the broken lines.

In the third preferred embodiment, as well as in the first and second preferred embodiments, the longitudinal-direction expansion and contraction of the first capacitor sections C1 positioned closer to the first side surface 2c is opposite to that of the second capacitor sections C2 positioned closer to the second side surface 2d, thus reducing the distortion of the multilayer capacitor 31. Additionally, although it is not shown, at a portion in which the first and second capacitor sections C1 and C2 are adjacent to each other, the widthwise-direction expansion and contraction of the first capacitor sections C1 is opposite to that of the second capacitor sections C2, and thus, they constrain each other, as discussed in the first preferred embodiment, thus further effectively reducing the distortion of the multilayer capacitor 31.

In the third preferred embodiment, the inner side portion of the first inner electrode 3 and that of the second inner electrode 4 face each other with a gap therebetween in the longitudinal direction. This gap overlaps the third outer electrodes 8 in the longitudinal direction. The gap is located at a position at which the first capacitor section C1 expands and the second capacitor section C2 contracts in the widthwise direction, thus reducing the distortion of the multilayer capacitor 31. Thus, the distortion transmitted to a circuit board via the third outer electrodes 8 is decreased, thus more effectively reducing the occurrence of noise.

Figure 12A:
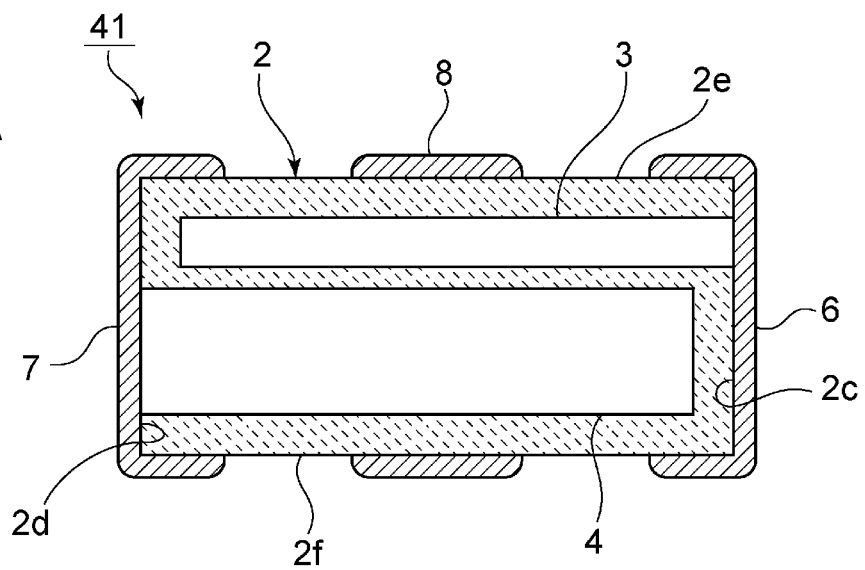
FIGS. 12A and 12B are plane sectional views of the multilayer capacitor of a fourth preferred embodiment of the present invention.
Figure 12B:
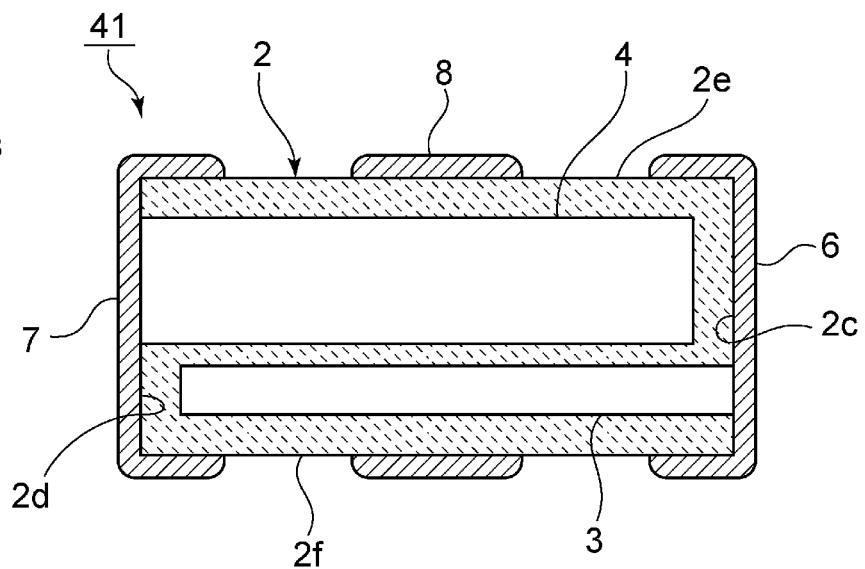
Figure 13:
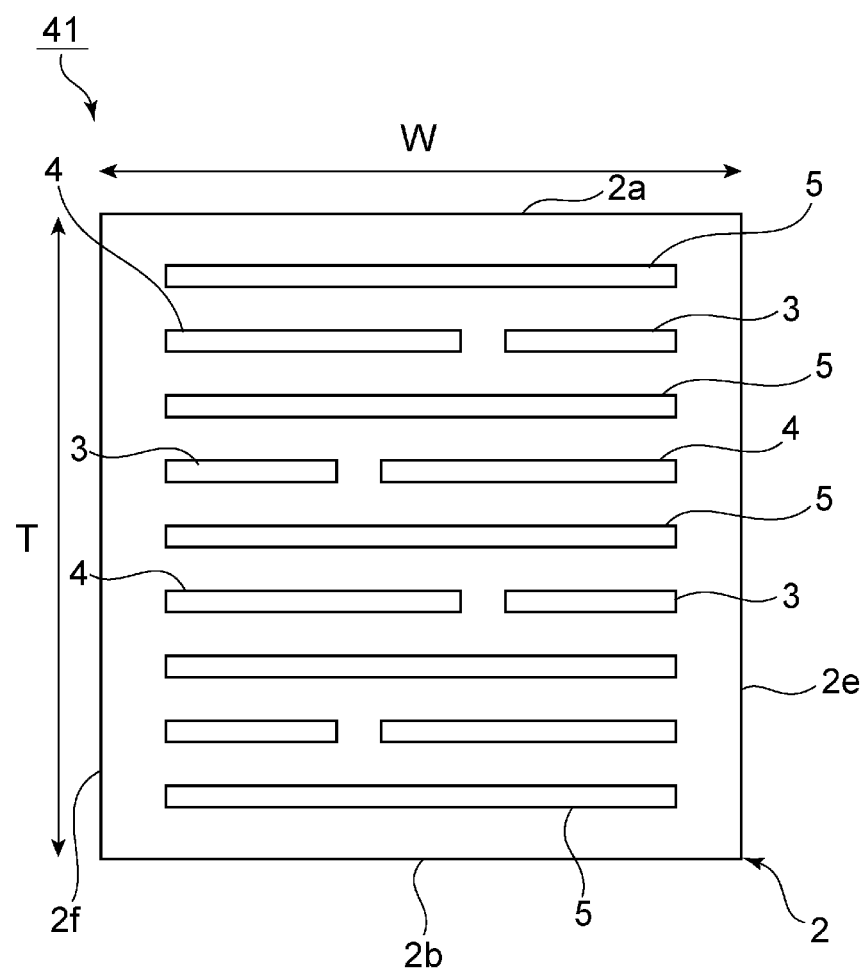
FIG. 13 is a schematic cross sectional view illustrating the expansion and contraction of first and second capacitor sections of the multilayer capacitor of the fourth preferred embodiment of the present invention.

FIGS. 12A and 12B are plane sectional views of a multilayer capacitor 41 of a fourth preferred embodiment of the present invention. FIG. 13 is a schematic cross sectional view of the multilayer capacitor 41.

The multilayer capacitor 41 of the fourth preferred embodiment is a modified example of the multilayer capacitor 1 of the first preferred embodiment. The multilayer capacitor 41 is similar to the multilayer capacitor 1, except that the widthwise dimension of the first inner electrode 3 is smaller than that of the second inner electrode 4. Thus, a description of the first preferred embodiment will be used for explaining portions of the multilayer capacitor 41 similar to those of the multilayer capacitor 1.

As shown in the cross sectional view of FIG. 13, in the multilayer body 2, a third inner electrode 5, a pair of first and second inner electrodes 3 and 4, a third inner electrode 5, and a pair of second and first inner electrodes 4 and 3 are stacked on each other in this order. Accordingly, as in the multilayer capacitor 1 of the first preferred embodiment, a first capacitor section C1 and a second capacitor section C2 are adjacent to each other in the widthwise direction W, and also, a first capacitor section C1 and a second capacitor section C2 are adjacent to each other in the stacking direction T.

Thus, as in the first preferred embodiment, by driving the first and second capacitor sections C1 and C2 such that the expansion and contraction of the first capacitor sections C1 and that of the second capacitor sections C2 cancel each other out and constrain each other, it is possible to reduce the distortion of the multilayer capacitor 41 as a whole.

Figure 14A:
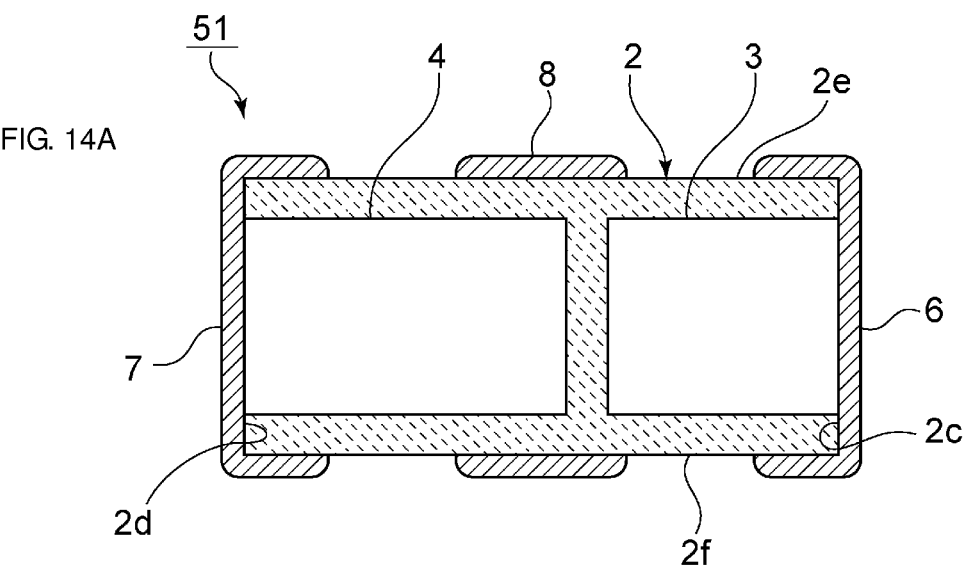
FIGS. 14A and 14B are plane sectional views of the multilayer capacitor of a fifth preferred embodiment of the present invention.
Figure 14B:
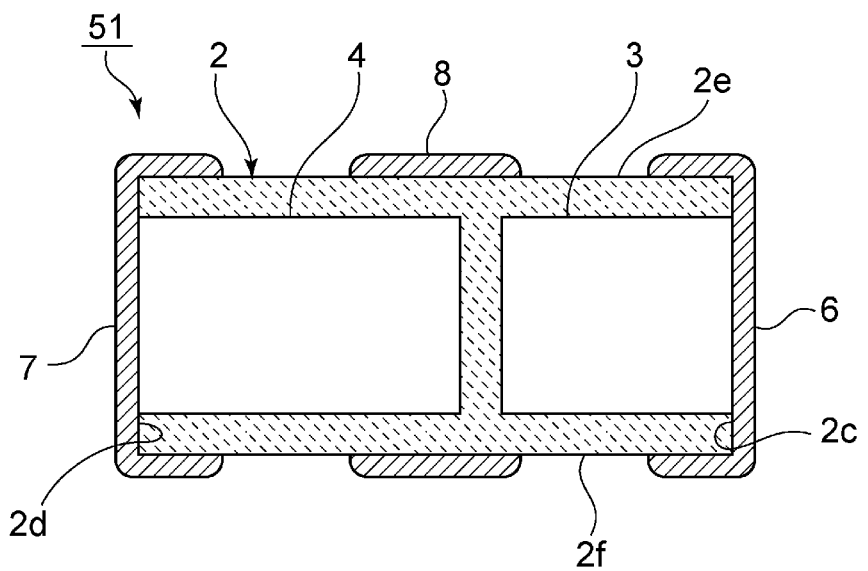
Figure 15:
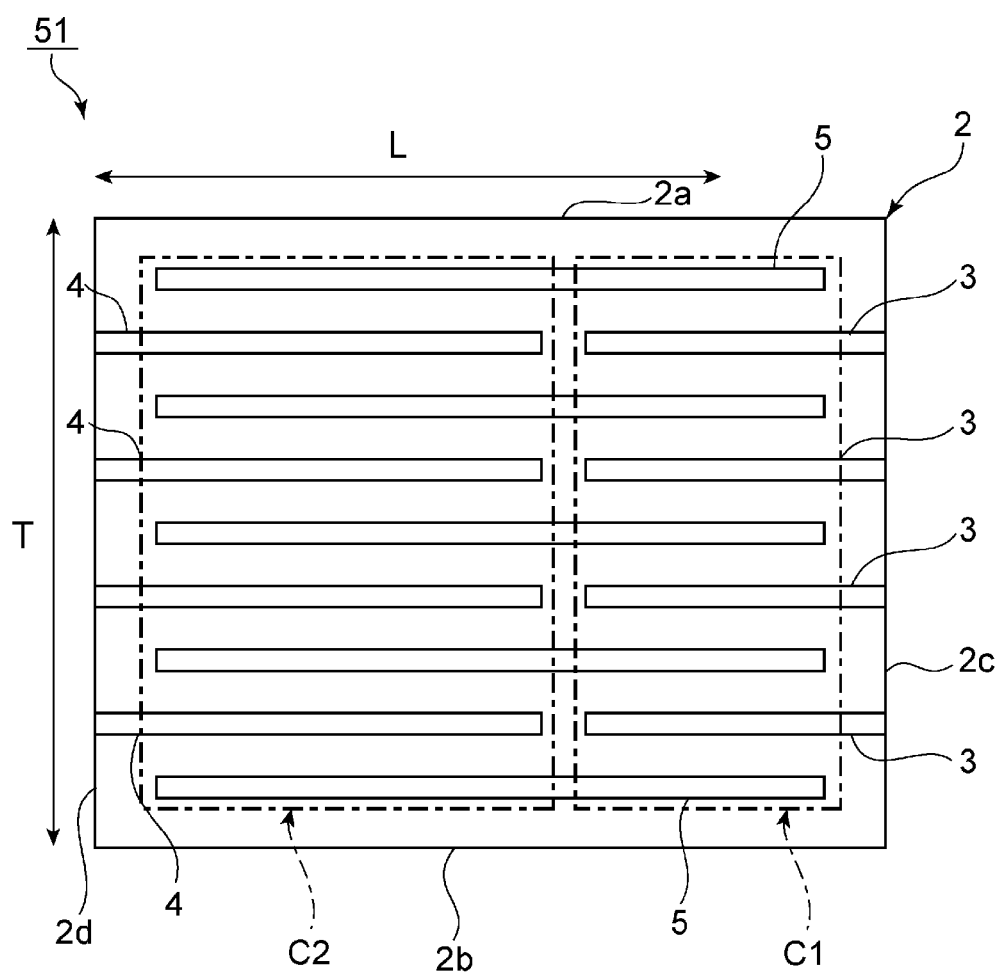
FIG. 15 is a schematic sectional view of the multilayer capacitor of the fifth preferred embodiment of the present invention.

FIGS. 14A and 14B are plane sectional views of a multilayer capacitor 51 of a fifth preferred embodiment of the present invention. FIG. 15 is a cross sectional view of the multilayer capacitor 51.

The multilayer capacitor 51 of the fifth preferred embodiment is a modified example of the multilayer capacitor 31 of the third preferred embodiment. FIGS. 14A and 14B illustrate first inner electrodes 3 and second inner electrodes 4 within planes at different heightwise positions. As shown in FIGS. 14A and 14B, the longitudinal dimension of the second inner electrode 4 is longer than that of the first inner electrode 3. The configurations of the other portions of the multilayer capacitor 51 are similar to those of the multilayer capacitor 31.

As shown in FIG. 15, in a plane at a certain heightwise position, the first inner electrodes 3 and the second inner electrodes 4 are separated from each other with a gap therebetween in the longitudinal direction L. The longitudinal dimension of the first inner electrodes 3 is shorter than that of the second inner electrodes 4. Accordingly, the longitudinal dimension of the first capacitor sections C1 is shorter than that of the second capacitor sections C2.

In the fifth preferred embodiment, as well as in the third preferred embodiment, a first capacitor section C1 and a second capacitor section C2 are adjacent to each other in the longitudinal direction of the multilayer body 2. It is thus preferable that the phase of an AC voltage or an AC component superposed on a voltage applied to the first capacitor section C1 be displaced from that applied to the second capacitor section C2 by about 90°, 180°, or 270°, as in the third preferred embodiment. With this arrangement, it is possible to effectively reduce the distortion of the multilayer capacitor 51 as a whole.

As in the fourth and fifth preferred embodiments, the area of the first capacitor section C1 by which the first inner electrode 3 opposes the third inner electrode 5 (hereinafter such an area may be referred to as the "opposing area of the first capacitor section C1") may be set to be different from that of the second capacitor section C2 by which the second inner electrode 4 opposes the third inner electrode 5 (hereinafter such an area may be referred to as the "opposing area of the second capacitor section C2"). In particular, if the voltage applied to the first capacitor section C1 differs from that applied to the second capacitor section C2, it is desirable that the opposing area of the first capacitor section C1 be set to differ from that of the second capacitor section C2 in accordance with the magnitude relation of the applied voltages.

Figure 16:
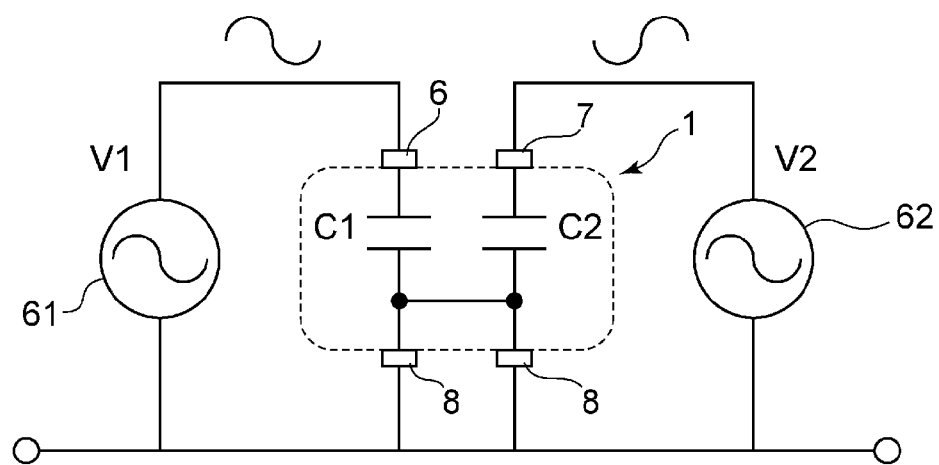
FIG. 16 is a circuit diagram illustrating a usage method for a multilayer capacitor according to a sixth preferred embodiment of the present invention.

FIG. 16 is a circuit diagram illustrating a usage method for a multilayer capacitor according to a sixth preferred embodiment of the present invention.

First and second AC power supplies 61 and 62 are connected to, for example, the multilayer capacitor 1 of the first preferred embodiment. Then, AC voltages out of phase of each other by about 180° are applied to the multilayer capacitor 1 from the first and second AC power supplies 61 and 62. With this operation, the expansion and contraction of the first capacitor section C1 is opposite to that of the second capacitor section C2. Thus, the expansion and contraction of the first capacitor section C1 and that of the second capacitor section C2 cancel each other out and constrain each other, thus significantly reducing the distortion of the multilayer capacitor 1 as a whole. The phase difference between the AC signal applied from the first AC power supply 61 and that from the second AC power supply 62 is not restricted to 180°, but may be about 90° or 270°.

It is desirable that, when driving the first and second capacitor sections C1 and C2, the voltages V1 and V2 applied from the first and second AC power supplies 61 and 62, respectively, be adjusted so that, if the potential difference of the voltage applied to the first capacitor section C1 is increased or decreased, the potential difference of the voltage applied to the second capacitor section C2 is decreased or increased. With this arrangement, it is possible to effectively reduce the distortion of the multilayer capacitor 1 as a whole.

Figure 17:
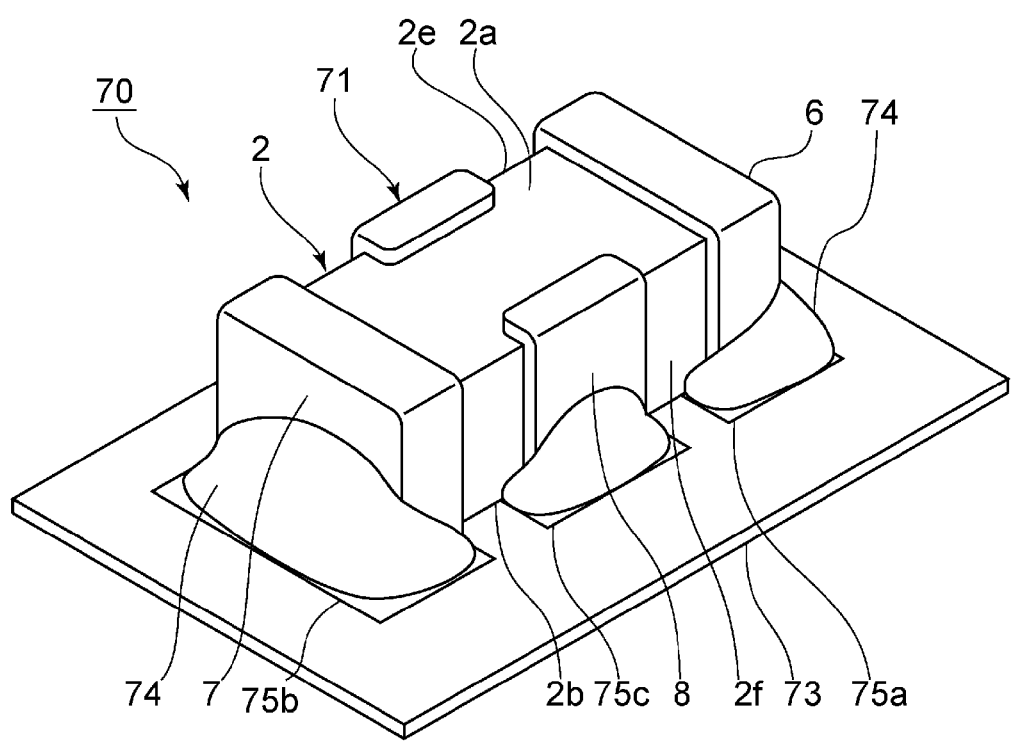
FIG. 17 is a perspective view illustrating a packaging structure including a multilayer capacitor according to a seventh preferred embodiment of the present invention.

FIG. 17 is a perspective view illustrating a packaging structure 70 including a multilayer capacitor 71 according to a seventh preferred embodiment of the present invention.

The packaging structure 70 includes the multilayer capacitor 71, a substrate 73, and a bonding agent 74. In the packaging structure 70, the multilayer capacitor 71 is mounted on the substrate 73 such that the second principal surface 2*b* used as a mounting surface faces the substrate 73. There are two modes in which the multilayer capacitor 71 is mounted on a substrate. In a first configuration, the first principal surface 2*a* or the second principal surface 2*b* is used as a mounting surface. In a second configuration, the third side surface 2*e* or the fourth side surface 2*f* is used as a mounting surface. In the packaging structure 70 shown in FIG. 17, the multilayer capacitor 71 is mounted on the substrate 73 by using the first configuration.

On the principal surface of the substrate 73, first, second, and third pads 75*a*, 75*b*, and 75*c* are disposed. The first pad 75*a* is electrically and mechanically connected to the first outer electrode 6 of the multilayer capacitor 71 via a bonding agent 74. The second pad 75*b* is electrically and mechanically connected to the second outer electrode 7 of the multilayer capacitor 71 via a bonding agent 74. The third pad 75*c* is electrically and mechanically connected to the third outer electrode 8 of the multilayer capacitor 71 via a bonding agent 74. The bonding agent 74 is preferably made of a suitable brazing filler metal, such as solder, for example.

The bonding agent 74 is disposed from the mounting surface toward the first and second side surfaces so as to form fillets. The fillets transmit the distortion of the multilayer capacitor 71. In the first configuration of the multilayer capacitors 1, 21, and 41 of the first, second, and fourth preferred embodiments, regardless of the height of the bonding agent 74 on the first and second side surfaces 2*c* and 2*d*, the area by which the first capacitor section C1 opposes a fillet and the area by which the second capacitor section C2 opposes a fillet are substantially the same, as viewed from the first and second side surfaces 2*c* and 2*d*. Accordingly, if the multilayer capacitor 1, 21, or 41 of the first, second, or fourth preferred embodiment is used, a packaging structure preferably has the first configuration.

The packaging structure 70 including a multilayer capacitor may be manufactured in the following manner, assuming that solder is used as the bonding agent 74 as an example.

First, a solder paste is printed on the first, second, and third pads 75*a*, 75*b*, and 75*c* on the substrate 73. Then, the multilayer capacitor 71 is mounted on the substrate 73 such that the solder paste is attached to the outer electrodes 6 through 8. Then, the substrate 73 having the multilayer capacitor 71 mounted thereon is placed in a reflow oven, thus melting and solidifying the solder paste.

As discussed above, by using the multilayer capacitor of a preferred embodiment of the present invention, even under the application of a DC voltage on which an AC voltage or an AC component is superposed, it is possible to significantly reduce the distortion of the multilayer capacitor as a whole and to significantly reduce or prevent the occurrence of noise.

Due to a decrease in the distortion of the multilayer capacitor, voltage smoothing is implemented by eliminating a ripple voltage, and also, the distortion caused by a ripple voltage is canceled out so as to significantly reduce the occurrence of noise. Thus, the multilayer capacitor of a preferred embodiment of the present invention is suitably used for voltage smoothing in voltage converter circuits, such as a DC-DC converter circuit, a charge pump circuit, and an AC-DC converter circuit, for example.

According to a preferred embodiment of the present invention, it is possible to effectively reduce the distortion which may cause vibration in a multilayer capacitor. Accordingly, a preferred embodiment of the present invention is particularly effective for the following types of multilayer capacitors in which vibration is likely to occur: a multilayer capacitor having electrostatic capacity as high as about 1 µF or higher, particularly, as high as about 10 µF or higher; a multilayer ceramic capacitor using a dielectric member having a relative dielectric constant as high as 3000 or higher; a multilayer capacitor having inner electrode layers as many as 350 or more; and a multilayer capacitor in which the thickness of a dielectric layer sandwiched between inner electrodes connected to different potentials is as thin as about 1 µm or smaller.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer capacitor comprising:
   a multilayer body including a dielectric layer and first, second and third inner electrodes and including first and second capacitor sections, the first capacitor section being connected to a voltage smoothing circuit; and
   a plurality of outer electrodes disposed on surfaces of the multilayer body and including first, second, and third outer electrodes; wherein
   the first capacitor section is electrically connected between the first and third outer electrodes;
   the second capacitor section, which decreases a potential difference applied to the first capacitor section, is electrically connected between the second and third outer electrodes;
   the first, second, and third inner electrodes in the multilayer body are connected to the first, second, and third outer electrodes, respectively;
   the first and third inner electrodes oppose each other with the dielectric layer therebetween so as to define the first capacitor section;
   the second and third inner electrodes oppose each other with the dielectric layer therebetween so as to define the second capacitor section;
   the first inner electrode has a greater electrode area than an electrode area of the second inner electrode;
   an area by which the first and third inner electrodes oppose each other is different from an area by which the second and third inner electrodes oppose each other;

the first and second capacitor sections are disposed in a stacking direction of the multilayer body; and in the stacking direction, at least one first capacitor section is positioned between a pair of the second capacitor sections, and at least one second capacitor section is positioned between a pair of the first capacitor sections.

2. The multilayer capacitor according to claim 1, wherein the first and second capacitor sections are disposed in a direction perpendicular or substantially perpendicular to the stacking direction of the multilayer body.

3. The multilayer capacitor according to claim 2, wherein the first and second capacitor sections are disposed in a direction perpendicular or substantially perpendicular to a direction in which the first and second outer electrodes oppose each other.

4. A usage method for the multilayer capacitor according to claim 1, wherein a voltage is applied to the multilayer capacitor such that, if a potential difference of a voltage applied to the first capacitor section is increased or decreased, a potential difference of a voltage applied to the second capacitor section is decreased or increased.

5. The usage method for the multilayer capacitor according to claim 4, wherein the voltage is applied to the multilayer capacitor such that a phase difference between an AC component superposed on a first DC voltage of a first DC power supply and an AC component superposed on a second DC voltage of a second DC power supply is about 90°, 180°, or 270°.

6. The usage method for the multilayer capacitor according to claim 4, wherein the voltage is applied to the multilayer capacitor such that expansion and contraction of the first capacitor section and that of the second capacitor section effectively cancel each other out.

7. A multilayer capacitor comprising:

a multilayer body including a dielectric layer and first, second, and third inner electrodes stacked on each other; and first, second, and third outer electrodes disposed on surfaces of the multilayer body; wherein the first and second inner electrodes are positioned within a same plane in the multilayer body which is perpendicular or substantially perpendicular to a stacking direction of the multilayer body;

the third inner electrodes are positioned within a plane in the multilayer body which is perpendicular or substantially perpendicular to the stacking direction and which is different from the plane within which the first and second inner electrodes are positioned;

the multilayer body includes a first capacitor section that includes a portion in which the first and third inner electrodes oppose each other with a portion of the dielectric layer therebetween;

the multilayer body includes a second capacitor section that includes a portion in which the second and third inner electrodes oppose each other with a portion of the dielectric layer therebetween;

the first, second, and third outer electrodes are electrically connected to the first, second, and third inner electrodes, respectively;

the multilayer body includes first and second principal surfaces opposing each other in the stacking direction, first and second side surfaces which oppose each other and which connect the first and second principal surfaces and are perpendicular or substantially perpendicular to the first and second principal surfaces, and third and fourth side surfaces which oppose each other and which are perpendicular or substantially perpendicular to the first and second principal surfaces and to the first and second side surfaces;

the first inner electrodes extend out to the first side surface;

the second inner electrodes extend out to the second side surface;

the first and second inner electrodes are separated from each other in a direction in which the third and fourth side surfaces are connected;

the third inner electrodes extend out to the third or fourth side surface;

at least one of the first inner electrodes is located closer to the third side surface than one of the second inner electrodes positioned within the same plane as a plane within which the at least one of the first inner electrodes is positioned; and at least one of the second inner electrodes positioned within a plane different from the plane within which the at least one of the first inner electrodes is positioned is located closer to the third side surface than one of the first inner electrodes positioned within the same plane as the plane in which the at least one of the second inner electrodes is positioned.

8. The multilayer capacitor according to claim 7, wherein in the multilayer body, a first stacked portion in which the first, second, and third inner electrodes are stacked on each other at a position close to the third side surface and a second stacked portion in which the first, second, and third inner electrodes are stacked on each other at a position close to the fourth side surface are provided;

in the first stacked portion, the third inner electrodes, the first inner electrodes, the third inner electrodes, and the second inner electrodes are repeatedly stacked on each other in order of the third inner electrodes, the first inner electrodes, the third inner electrodes, and the second inner electrodes; and in the second stacked portion, the third inner electrodes, the second inner electrodes, the third inner electrodes, and the first inner electrodes are repeatedly stacked on each other in order of the third inner electrodes, the second inner electrodes, the third inner electrodes, and the first inner electrodes.

9. The multilayer capacitor according to claim 7, wherein an area by which the first and third inner electrodes oppose each other is greater than an area by which the second and third inner electrodes oppose each other.

10. The multilayer capacitor according to claim 7, wherein the first outer electrode is disposed on the first side surface, the second outer electrode is disposed on the second side surface, and the third outer electrode is disposed on at least one of the third and fourth side surfaces.

11. A usage method for the multilayer capacitor according to claim 7, wherein a voltage is applied to the multilayer capacitor such that, if a potential difference of a voltage applied to the first capacitor section is increased or decreased, a potential difference of a voltage applied to the second capacitor section is decreased or increased.

12. The usage method for the multilayer capacitor according to claim 11, wherein the voltage is applied to the multilayer capacitor such that a phase difference between an AC component superposed on a first DC voltage of a first DC power supply and an AC component superposed on a second DC voltage of a second DC power supply is about 90°, 180°, or 270°.

13. The usage method for the multilayer capacitor according to claim 11, wherein the voltage is applied to the multilayer capacitor such that expansion and contraction of the first capacitor section and that of the second capacitor section effectively cancel each other out.

14. A multilayer capacitor, comprising:
a multilayer body including a dielectric layer and first, second, and third inner electrodes stacked on each other; and
first, second, and third outer electrodes disposed on surfaces of the multilayer body; wherein
the first and second inner electrodes are positioned within a same plane in the multilayer body which is perpendicular or substantially perpendicular to a stacking direction of the multilayer body;
the third inner electrode is positioned within a plane in the multilayer body which is perpendicular or substantially perpendicular to the stacking direction and which is different from the plane within which the first and second inner electrodes are positioned;
the multilayer body includes a first capacitor section that includes a portion in which the first and third inner electrodes oppose each other with a portion of the dielectric layer therebetween;
the multilayer body includes a second capacitor section that includes a portion in which the second and third inner electrodes oppose each other with a portion of the dielectric layer therebetween;
the first, second, and third outer electrodes are electrically connected to the first, second, and third inner electrodes, respectively;
the multilayer body includes first and second principal surfaces opposing each other in the stacking direction, first and second side surfaces which oppose each other and which connect the first and second principal surfaces and are perpendicular or substantially perpendicular to the first and second principal surfaces, and third and fourth side surfaces which oppose each other and which are perpendicular or substantially perpendicular to the first and second principal surfaces and to the first and second side surfaces;
the first inner electrode extends out to the first side surface;
the second inner electrode extends out to the second side surface;
the first and second inner electrodes are separated from each other in a direction in which the third and fourth side surfaces are connected;
the third inner electrode extends out to the third or fourth side surface; and
the third inner electrode includes an area in which the third inner electrode is sandwiched between the first inner electrode and the second inner electrode in the stacking direction.

15. The multilayer capacitor according to claim 14, wherein an area by which the first and third inner electrodes oppose each other is greater than an area by which the second and third inner electrodes oppose each other.

16. The multilayer capacitor according to claim 14, wherein the first outer electrode is disposed on the first side surface, the second outer electrode is disposed on the second side surface, and the third outer electrode is disposed on at least one of the third and fourth side surfaces.

17. A usage method for the multilayer capacitor according to claim 14, wherein a voltage is applied to the multilayer capacitor such that, if a potential difference of a voltage applied to the first capacitor section is increased or decreased, a potential difference of a voltage applied to the second capacitor section is decreased or increased.

18. The usage method for the multilayer capacitor according to claim 17, wherein the voltage is applied to the multilayer capacitor such that a phase difference between an AC component superposed on a first DC voltage of a first DC power supply and an AC component superposed on a second DC voltage of a second DC power supply is about 90°, 180°, or 270°.

19. The usage method for the multilayer capacitor according to claim 17, wherein the voltage is applied to the multilayer capacitor such that expansion and contraction of the first capacitor section and that of the second capacitor section effectively cancel each other out.

20. A multilayer capacitor comprising:
a multilayer body including a dielectric layer and first, second and third inner electrodes and including first and second capacitor sections, the first capacitor section being connected to a voltage smoothing circuit; and
a plurality of outer electrodes disposed on surfaces of the multilayer body and including first, second, and third outer electrodes; wherein
the first capacitor section is electrically connected between the first and third outer electrodes;
the second capacitor section, which decreases a potential difference applied to the first capacitor section, is electrically connected between the second and third outer electrodes;
the first, second, and third inner electrodes in the multilayer body are connected to the first, second, and third outer electrodes, respectively;
the first and third inner electrodes oppose each other with the dielectric layer therebetween so as to define the first capacitor section;
the second and third inner electrodes oppose each other with the dielectric layer therebetween so as to define the second capacitor section;
the first inner electrode has a greater electrode area than an electrode area of the second inner electrode;
an area by which the first and third inner electrodes oppose each other is different from an area by which the second and third inner electrodes oppose each other; and
the first and second inner electrodes include overlapping portions that overlap each other in a stacking direction of the multilayer body.

* * * * *